(12) United States Patent
Tsimhoni et al.

(10) Patent No.: US 9,798,323 B2
(45) Date of Patent: Oct. 24, 2017

(54) CROWD-SOURCED TRANSFER-OF-CONTROL POLICY FOR AUTOMATED VEHICLES

(71) Applicant: GM GLOBAL TECHNOLOGY OPERATIONS LLC, Detroit, MI (US)

(72) Inventors: Omer Tsimhoni, Ramat Hasharon (IL); Claudia V. Goldman-Shenhar, Mevasseret Zion (IL); Ron M. Hecht, Raanana (IL); Jeremy A. Salinger, Southfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 511 days.

(21) Appl. No.: 14/444,314

(22) Filed: Jul. 28, 2014

(65) Prior Publication Data

US 2016/0026180 A1    Jan. 28, 2016

(51) Int. Cl.
*G05D 1/00* (2006.01)
*B60W 30/00* (2006.01)
*G06Q 50/00* (2012.01)

(52) U.S. Cl.
CPC ......... *G05D 1/0061* (2013.01); *B60W 30/00* (2013.01); *G06Q 50/00* (2013.01); *G05D 2201/0213* (2013.01)

(58) Field of Classification Search
None
See application file for complete search history.

(56) References Cited

U.S. PATENT DOCUMENTS

| 9,176,500 | B1* | 11/2015 | Teller | G05D 1/0088 |
| 2014/0156133 | A1* | 6/2014 | Cullinane | B60W 30/00 701/23 |
| 2014/0358353 | A1* | 12/2014 | Ibanez-Guzman | G05D 1/0027 701/23 |
| 2015/0344066 | A1* | 12/2015 | Tsubaki | B62D 1/286 701/41 |

OTHER PUBLICATIONS

Pineda, L., et al., "Fault-Tolerant Planning Under Uncertainty", Proceedings of the 23rd International Joint Conference on Artificial Intelligence (IJCAI). Beijing, China, Aug. 3-9, 2013.

* cited by examiner

*Primary Examiner* — Mussa A Shaawat
*Assistant Examiner* — Kyung Kim
(74) *Attorney, Agent, or Firm* — Lorenz & Kopf, LLP

(57) ABSTRACT

An automated vehicle includes a control system configured to selectively transfer the automated vehicle from an automated control mode to a manual control mode based on a transfer-of-control criterion. The transfer-of-control criterion is based on a current context of the automated vehicle and a dataset of previous transfer-of-control events and previous contexts associated with the operation of a plurality of additional automated vehicles.

20 Claims, 2 Drawing Sheets

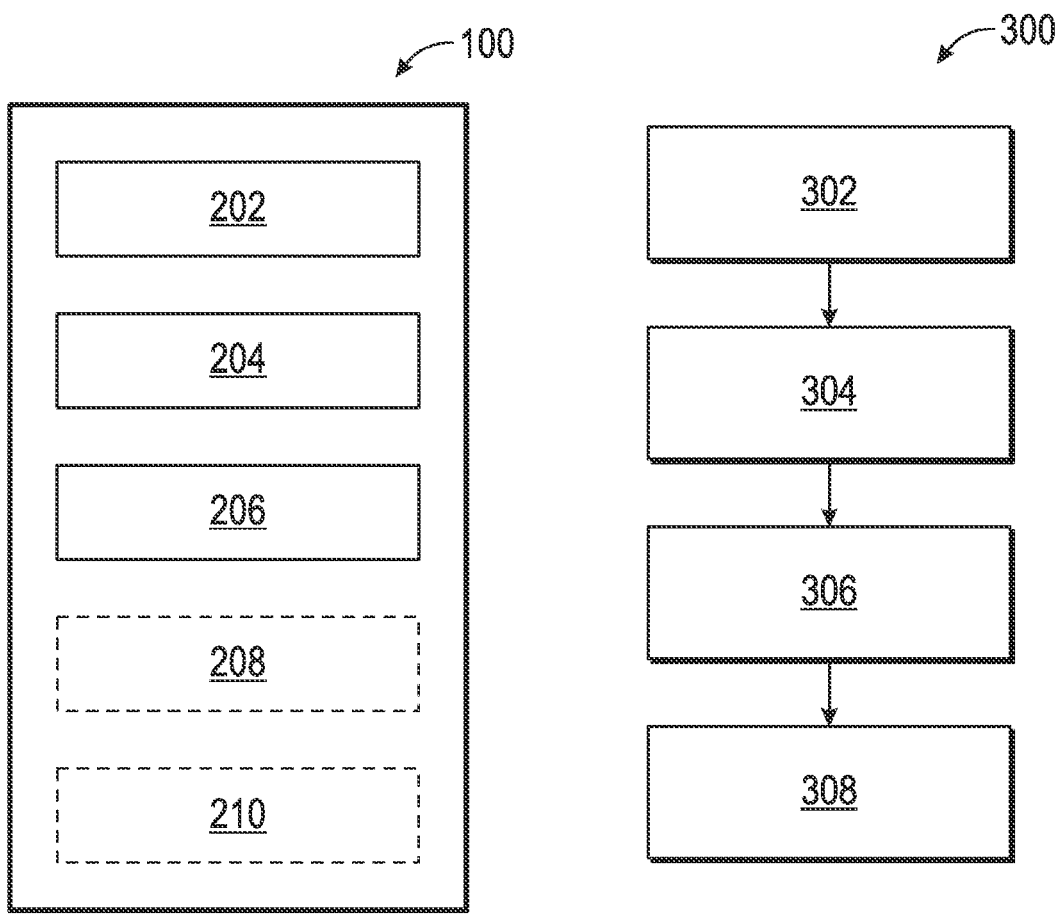

CROWD-SOURCED TRANSFER-OF-CONTROL POLICY FOR AUTOMATED VEHICLES

TECHNICAL FIELD

The technical field generally relates to vehicles with the capability of driving automatically, and more particularly relates to systems and methods for transferring control of such vehicles between an automated mode and a manual mode.

BACKGROUND

Recent years have seen an increased interest in autonomous, semi-autonomous, and otherwise automated vehicles. Such automated vehicles are generally configured to operate in two modes: a "manual" mode in which the driver is able to manually operate the vehicle in the traditional manner, and an "automated" mode in which the vehicle is to some extent operated (via a control system) independently of the driver.

One of the primary challenges posed by automated vehicles is the the need for implementing a suitable "transfer-of-control" policy—i.e., the conditions under which the vehicle should switch (or is likely to switch) from an automated mode to a manual mode, or vice versa. Control will typically be transferred to the driver, for example, when the driving task it too difficult to accomplish in an automated mode or when the confidence of the automatic system in its own performance is lower than some threshold value. Currently known mechanisms for transferring control in such contexts can result in sudden transfers and be based on overly rigid, non-adaptive criteria that are not likely to accommodate a particular driver's needs.

Accordingly, it is desirable to provide improved transfer-of-control policies for automated vehicles. Furthermore, other desirable features and characteristics of the present invention will become apparent from the subsequent detailed description and the appended claims, taken in conjunction with the accompanying drawings and the foregoing technical field and background.

SUMMARY

In accordance with one embodiment, an automated vehicle includes a control system configured to selectively transfer the automated vehicle from an automated control mode to a manual control mode based on a transfer-of-control criterion. The transfer-of-control criterion is based on a current context of the automated vehicle and a dataset (e.g., a crowdsourced dataset) of previous transfer-of-control events and previous contexts associated with the operation of a plurality of additional automated vehicles.

In accordance with one embodiment, a method for operating an automated vehicle having an automated control mode and a manual control mode includes predicting a transfer-of-control event based on a transfer-of-control criterion, wherein the transfer-of-control criterion is based on a current context of the automated vehicle and a dataset of previous transfer-of-control events and previous contexts associated with the operation of a plurality of additional automated vehicles; and requesting that the automated vehicle perform an action based on the transfer-of-control event.

DESCRIPTION OF THE DRAWINGS

The exemplary embodiments will hereinafter be described in conjunction with the following drawing figures, wherein like numerals denote like elements, and wherein:

FIG. 2 is a functional block diagram of an automatic vehicle control system in accordance with various exemplary embodiments; and FIG. 3 is a flow chart depicting a method in accordance with an exemplary embodiment.

DETAILED DESCRIPTION

Figure 1:
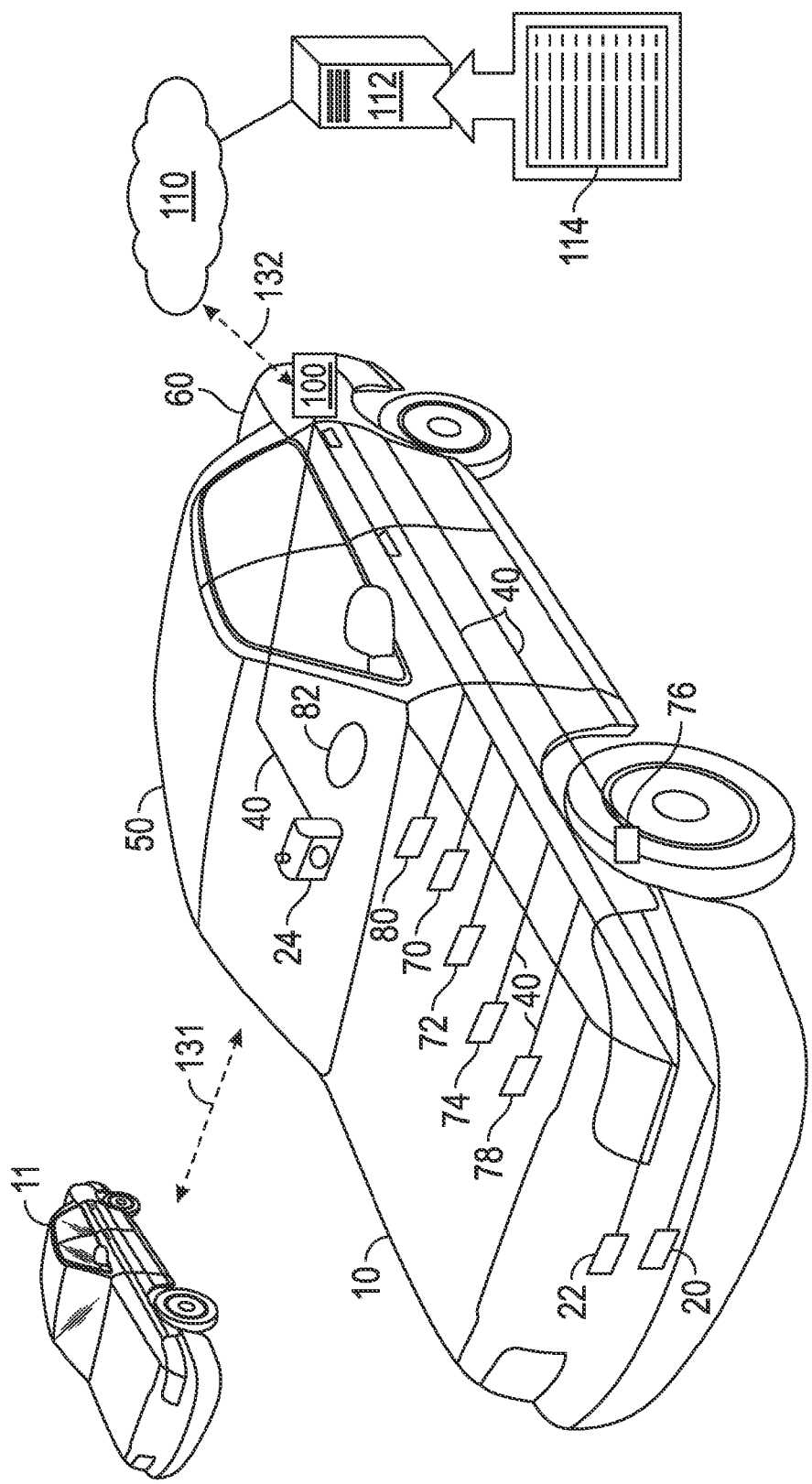
FIG. 1 is a conceptual overview of an automated vehicle in accordance with an exemplary embodiment.

In general, the subject matter described herein relates to an automated vehicle control system that utilizes crowd-sourced data (e.g., a dataset specifying past transfer-of-control events associated with other vehicles and/or drivers in a similar context) to determine whether transfer-of-control from automated to manual (or vice versa) is likely and/or desirable. In that regard, the following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, in accordance with exemplary embodiments of the subject matter described herein, an automated vehicle (or simply "vehicle") 10 is illustrated. In this regard, the term "automated vehicle" as used herein generally refers to a vehicle that has an "automated" mode in which the vehicle 10 (through a suitable control system and any number of sensors) is configured to monitor its environment and navigate without human (e.g., driver) interaction. Such a vehicle will generally also have a "manual" mode that allows the driver to resume manual control of the vehicle 10 when, for example, the driver feels more comfortable with manual control. The driver will generally be able to switch between these two modes at will, but the vehicle 10 may automatically transfer back to "manual" under certain conditions. Thus, as mentioned briefly above, the conditions under which an automated vehicle is likely to switch between automated and manual modes is referred to as its "transfer-of-control" policy.

As shown, vehicle 10 is configured to communicate, through any convenient data communication channel 132, with a server 112 (including a controller, memory, storage, network interface, and other conventional components as is known in the art) configured to store a "crowdsourced" dataset 114 of previous transfer-of-control events and previous contexts associated with the operation of other, additional automated vehicles. Vehicle 10 may also be configured to communicate with other vehicles (e.g., vehicle 11) in the vicinity using a convenient vehicle-to-vehicle ("V2V") communication channel 131. While dataset 114 is illustrated as residing within an external server 112, the embodiments are not so limited; dataset 114 may be located and/or distributed over many locations, such as within vehicle 10, in other vehicles (vehicle 11), or in a number of databases accessible over one or more networks.

Vehicle 10 also includes an automated vehicle control system (or simply "control system") 100. Control system 100 may operate in conjunction with or separate from one or more other automatic vehicle control systems, autonomous driving applications, or vehicle automated steering systems (not shown), such as a vehicle automated steering system providing, for example, adaptive lane centering, low speed lane centering, lane keeping assist, or other applications. Control system 100, when in an "automated mode" fully or partially controls the steering and throttle of vehicle 10 and reduces the need for driver steering control input via a steering wheel 82 and/or other components of the steering system.

One or more sensors may be coupled to or associated with vehicle 10, including, for example, a computer vision sensor (e.g., a camera) 24, a lidar or ladar sensor 20, a radar sensor 22, and/or any another remote sensing device useful in determining the relative location of vehicle 10 with respect to nearby features such as lane markers, road shoulder, median barriers, road edges, other vehicles, and the like. Camera 24 may, for example, measure lane offset, heading angle, lane curvature and/or other information (e.g., speed, acceleration, yaw-rate, other driver input etc.) and provide such information to control system 100.

In one embodiment of the present disclosure, vehicle 10 may include one or more devices or sensors to measure vehicle steering measurements, vehicle steering conditions, vehicle steering parameters, vehicle dynamics, driver input, or other vehicle related conditions or measurements. The vehicle dynamics measurement device(s) may include one or more steering angle sensors 70 and/or steering torque sensors 80. The vehicle dynamics measurement devices may also include one or more accelerometers 72, speedometers 74, wheel speed sensors 76, inertial measurement units (IMUs) 78, and the like. The vehicle dynamics measurement devices may measure vehicle dynamics conditions or driver input including steering angle, steering torque, steering direction, lateral (e.g., angular or centripetal) acceleration, longitudinal acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to control system 100 via, for example, a wire link (e.g., a controller area network bus CAN bus, Flexray link, Ethernet link) 40 or a wireless link. Vehicle 10 will also generally include one or more internal displays 25 viewable by the driver and/or passengers. As will be appreciated by those skilled in the art, in the interest of simplicity, various automated steering and throttle components commonly used in connection with automated vehicles have not been illustrated in FIG. 1.

In general, control system 100 includes any suitable combination of hardware and/or software configured to selectively transfer automated vehicle 10 from an automated control mode to a manual control mode based on a transfer-of-control criterion. In one embodiment, the transfer-of-control criterion is based on a current context of the automated vehicle and a dataset (e.g., a crowdsourced dataset 114) of previous transfer-of-control events and previous contexts associated with the operation of a number of other automated vehicles in similar contexts. Stated another way, control system 100 attempts to "predict" that a transfer-of-control event is likely to (or should) take place with respect to vehicle 10 based on how other vehicles and drivers have reacted under similar conditions, as determined from "event data" and "context data" previously received and compiled with respect to other automated vehicles.

The term "context" as used herein refers to any number of attributes used to characterize the state of vehicle 10, its driver (if any), and its surroundings. The terms "transfer-of-control event data" and "event data" refer to any suitable representation of the type of transfer-of-control event (e.g., "changed from automated mode to manual mode") and the time at which that event occurred. The context associated with vehicle 10 may include, for example, the vehicle's geographical location (e.g., GPS coordinates), the speed and acceleration of vehicle 10, whether vehicle 10 is being driven during the day or night, weather conditions (rain, snow, sunny, cloudy, etc.), the identity of the driver, the mood of the driver (as determined from physiological sensors and/or wearable devices), the local curvature of the road, the nature of any media being played within the vehicle (e.g., type of music, volume, etc.), whether vehicle 10 had previously been operated on the current road, traffic conditions (congested, light, etc.). The context may be represented in any suitable fashion, using various encoding schemes. In one embodiment, for example, the context is a stored as a suitable data structure including a set of alpha-numeric codes, each associated with a respective context state.

In one embodiment, wherein the control system is configured to receive, over a network, a transfer-event probability value computed by a processor remote from the automated vehicle 10, wherein the transfer-event probability data is computed based on the dataset and the current context of the automated vehicle 10. In one embodiment, the transfer-of-control criterion includes determining whether the transfer-event probability value (or likelihood value) is greater than a predetermined threshold.

In some embodiments, control system 100 is configured to request that the automated vehicle 10 perform an action based on the transfer-of-control criterion. This action may take a variety of forms, ranging from simply notifying the user that a transfer-of-control event is to take place (and optionally allowing the driver to accept or reject that event) to actions that provide accident avoidance or otherwise. In some embodiments, the alert includes a visual representation (e.g., shown via display 25) of a reason for transferring from the automated control mode to the manual control mode. Such a reason might be a summary of the particular context or contexts that led to that condition (e.g., "night-time+rain", "sharp curve ahead", etc.) In other embodiments, the action is an accident avoidance action. In still other embodiments, the operation of vehicle 10 is automatically modified—e.g., by lowering the audio volume, increasing or decreasing the cabin temperature, engaging the electronic stability control, or the like. In another embodiment, the set speed of the cruise control unit is lowered if a very sharp curve is approaching and there is high probability of a transfer to manual control. In such a case, lowering the speed may avoid the transfer of control. In another embodiment, the automotive headlight settings are altered—e.g., the high-beam lights may be activated.

By way of example, consider an example where a particular curve is known to be difficult to negotiate. Dataset 114 will reflect that many automated vehicles entering this curve have transferred control to manual. Subsequently, when vehicle 10 approaches this curve in the automated mode, the driver is alerted (e.g., via a visual cue on display 25) to the fact that a transfer-of-control event is likely to occur. In another example, dataset 114 might reflect that many automated vehicles have difficulty recognizing the lane markers on a particular stretch of highway when the sun is at a particular position. Subsequently, when vehicle 10 is driven on that stretch of highway under similar conditions (e.g., same time-of-day), the driver might be notified that he or she should take manual control. As another example, dataset 114 might reflect that a particular stretch of road is associated with nearly no transfer-of-control events. In such a case, the system may display an alert suggesting to overly-cautious drivers that the automated mode might be engaged with high confidence.

FIG. 2 is a conceptual block diagram of an automatic vehicle control system (or simply "control system") 100 in accordance with various exemplary embodiments. In general, control system 100 includes an event reporter module 202, an analysis module 204, and an action determination module 206.

Event reporter module 202 includes any suitable combination of hardware and/or software configured to transmit, over a network (e.g., 110 of FIG. 1), transfer-of-control event data and context data associated with the automated vehicle to a server (e.g., server 112 of FIG. 1) storing a dataset (e.g., 114) of previous transfer-of-control events and previous contexts associated with the operation of a plurality of additional automated vehicles.

Analysis module 204 includes any suitable combination of hardware and/or software configured to predict that a transfer-of-control event will (or should) occur based on the transfer-of-control criterion. As described above, the transfer-of-control criterion may take a variety of forms. While analysis module 204 is illustrated as being part of control module 100, certain functionality provided by this module might be distributed to other servers or controllers, such as server 112 of FIG. 1. That is, analysis as described below may be performed substantially within vehicle 10 (e.g., based on previously downloaded information derived from dataset 114), performed substantially by external server 112, or any combination thereof.

In one embodiment, a transfer-event probability value is computed based on the dataset 114 and the current context of automated vehicle 10, and the transfer-of-control criterion includes determining whether the transfer-event probability value (or a value derived from the probability value, such as a likelihood ratio) is greater than a predetermined threshold.

More particularly, given a "context" that is characterized by a vector of features $f_i$ (e.g., "raining", "night time", geographical location, etc.), analysis module 204 computes the probability of a transfer as well as the probability of not transferring, given dataset 114. That is, analysis module 204 computes $Pr(f_1, \ldots f_n|\text{transfer})$ and $Pr(f_1, \ldots f_n|\text{not (transfer)})$ using, for example, naive Bayesian analysis, as is known in the art. Next, analysis module 100 computes the log-likelihood ρ based on those probabilities, e.g.:

$$\rho = Pr(f_1, \ldots f_n|\text{transfer})/Pr(f_1, \ldots f_n|\text{not(transfer)}).$$

Finally, analysis module 204 determines whether the log-likelihood value ρ is greater than a predetermined threshold, e.g., a value of 0.6. It will be appreciated that the predetermined threshold may vary, depending upon any number of factors.

Action determination module 206 includes any suitable combination of hardware and/or software configured to request that the automated vehicle 10 perform an action based on the transfer-of-control event, as described in detail above. That is, using the previous example, if it determined that the log-likelihood value ρ is greater than the threshold of 0.6, action determination module 206 may notify the driver (e.g., using a dashboard indicator or display 25 of FIG. 1) that a transfer-of-control event is to take place. This notification might include the reason that control is being transferred (e.g., "sharp turn in rainy conditions" or the like).

In one embodiment, control system 100 further includes a learning module 208 configured to learn when control system 100 itself is likely to perform a particular action, given local data (i.e., not crowdsourced data) associated with the behavior of the vehicle and/or its driver. For example, learning module 208 might learn from past hard-braking events, anti-lock braking system (ABS) activation, electronic stability control (ESC) events, and the like for vehicle 10 and/or its driver. Learning module 208 might also take into account high accident areas and/or unstable road conditions where skidding or ESC activation is more likely. The resulting information can then be used to modify the transfer-of-event criterion and/or the action or alert to be given.

In one embodiment, control system 100 further includes a second learning module 210 configured to adapt the transfer-of-control criterion based on learned driver behavior. For example, learning module 210 might determine that the driver tends to engage/disengage automated driving features in certain contexts, or that the driver chooses certain turning points in response to turn-by-turn advice. Learning module 210 may also determine, for example, that the driver tends to turn on or off the high-beam headlights or disables adaptive headlight functions in certain contexts, that the driver tends to turn on or off the fog lights in certain contexts, and/or that the driver tends to activate the "recirculation" climate control feature in certain contexts (e.g., heavy traffic). Learning module 210 might also determine power consumption as a function of position, slope, and other context information. The resulting information can be used to modify the transfer-of-event criterion and/or the action to be taken in a given context.

FIG. 3 is a flowchart depicting a method 300 in accordance with one embodiment. While the illustrated method is shown as including four steps (302-308), it will be appreciated that additional and/or intervening steps may be performed in various implementations. In various embodiments, the method can be scheduled to run based on predetermined events, and/or can run continually during operation of the vehicle 10.

Referring now to FIG. 3 in conjunction with FIG. 1, first, at 302, a crowdsourced dataset (114 in FIG. 1) is compiled based on transfer-of-control events and contexts provided by a plurality of automated vehicles (e.g., vehicles 11 and 10 of FIG. 1). The details of such a dataset are described in detail above.

Next, at 304, vehicle 10 is placed in an automated mode. This may be accomplished, for example, by user actuation of a switch, an audio command, through a navigation system interface, or through any other conventional user interface known in the art.

Subsequently, at 306, a transfer-of-control event is predicted based on a transfer-of-control criterion, wherein the transfer-of-control criterion is based on the current context of the automated vehicle and the dataset of previous transfer-of-control events and previous contexts associated with the operation of a plurality of additional automated vehicles (compiled at 302). Finally, at 308, the system requests that the automated vehicle perform an action based on the transfer-of-control event, as described above. This step might include downloading (via connection 132) portions of dataset 114 that relate to the current context of vehicle 10 (e.g., its location), or relevant probability data previously computed externally by server 112. In some embodiments, the information needed to predict a transfer-of-control event is pre-loaded for a particular region in which vehicle 10 is being driven. As a result, connectivity (via 132) need not be constant.

In summary, systems and methods have been described for an automated vehicle control system that utilizes crowd-sourced data (e.g., a dataset specifying past transfer-of-control events associated with other vehicles and/or drivers in a similar context) to determine whether transfer of control from automated to manual is likely and/or desirable in a given context. This results in increased system predictability and improved confidence from a driver's point of view.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An automated vehicle comprising:
a control system configured to selectively transfer the automated vehicle from an automated control mode to a manual control mode based on a transfer-of-control criterion;
wherein the transfer-of-control criterion is based on a current context of the automated vehicle and a dataset of previous transfer-of-control events and previous contexts associated with the operation of a plurality of additional automated vehicles.

2. The automated vehicle of claim 1, wherein the control system is configured to receive, over a network, a transfer-event probability value computed by a processor remote from the automated vehicle, wherein the transfer-event probability data is computed based on the dataset and the current context of the automated vehicle.

3. The automated vehicle of claim 2, wherein the transfer-of-control criterion includes determining whether the transfer-event probability value is greater than a predetermined threshold.

4. The automated vehicle of claim 1, wherein the control system is further configured to request that the automated vehicle perform an action based on the transfer-of-control criterion.

5. The automated vehicle of claim 4, wherein the action includes an alert indicating that the automated vehicle is to be transferred from the automated control mode to the manual control mode.

6. The automated vehicle of claim 4, wherein the alert includes a visual representation of a reason for transferring from the automated control mode to the manual control mode or remaining in the automated mode.

7. The automated vehicle of claim 4, wherein the action is an accident avoidance action.

8. The automated vehicle of claim 4, wherein the control system is further configured to learn when it is likely to perform the action.

9. The automated vehicle of claim 1, wherein the control system is further configured to adapt the transfer-of-control criterion based on driver behavior.

10. A method for operating an automated vehicle having an automated control mode and a manual control mode, the method comprising:
predicting, with a processor, a transfer-of-control event based on a transfer-of-control criterion, the transfer-of-control criterion based on a current context of the automated vehicle and a dataset of previous transfer-of-control events and previous contexts associated with the operation of a plurality of additional automated vehicles; and
requesting, with the processor, that the automated vehicle perform an action based on the transfer-of-control event, the action including transferring control of the automated vehicle to the manual control mode.

11. The method of claim 10, further including receiving, over a network, a transfer-event probability value computed by a processor remote from the automated vehicle, wherein the transfer-event probability data is computed based on the dataset and the current context of the automated vehicle.

12. The method of claim 11, wherein the transfer-of-control criterion includes determining whether the transfer-event probability value is greater than a predetermined threshold.

13. The method of claim 10, wherein the action includes outputting an alert indicating that the automated vehicle is to be transferred from the automated control mode to the manual control mode.

14. The method of claim 10, further including adapting the transfer-of-control criterion based on driver behavior.

15. An automated vehicle control system for a vehicle having an automated control mode and a manual control mode, the automated vehicle control system comprising:
an event reporter module configured to transmit, over a network, transfer-of-control event data and context data associated with the automated vehicle to a server storing a dataset of previous transfer-of-control events and previous contexts associated with the operation of a plurality of additional automated vehicles;
an analysis module, including a processor, configured to predict a transfer-of-control event based on a transfer-of-control criterion, the transfer-of-control criterion based on a current context of the automated vehicle and the dataset; and
an action determination module configured to request that the automated vehicle perform an action based on the transfer-of-control event, the action including transferring control of the automated vehicle to the manual control mode.

16. The automated vehicle control system of claim 15, wherein the analysis module is configured to receive, over a network, a transfer-event probability value computed by a processor remote from the automated vehicle, wherein the transfer-event probability data is computed based on the dataset and the current context of the automated vehicle.

17. The automated vehicle control system of claim 16, wherein the transfer-of-control criterion includes determining whether the transfer-event probability value is greater than a predetermined threshold.

18. The automated vehicle control system of claim 15, wherein the action includes an alert indicating that the automated vehicle is to be transferred from the automated control mode to the manual control mode.

19. The automated vehicle control system of claim 15, wherein the analysis module is further configured to learn when the action determination module is likely to request the action.

20. The automated vehicle control system of claim 15, wherein the analysis module is further configured to adapt the transfer-of-control criterion based on driver behavior.

* * * * *